Figure 1:
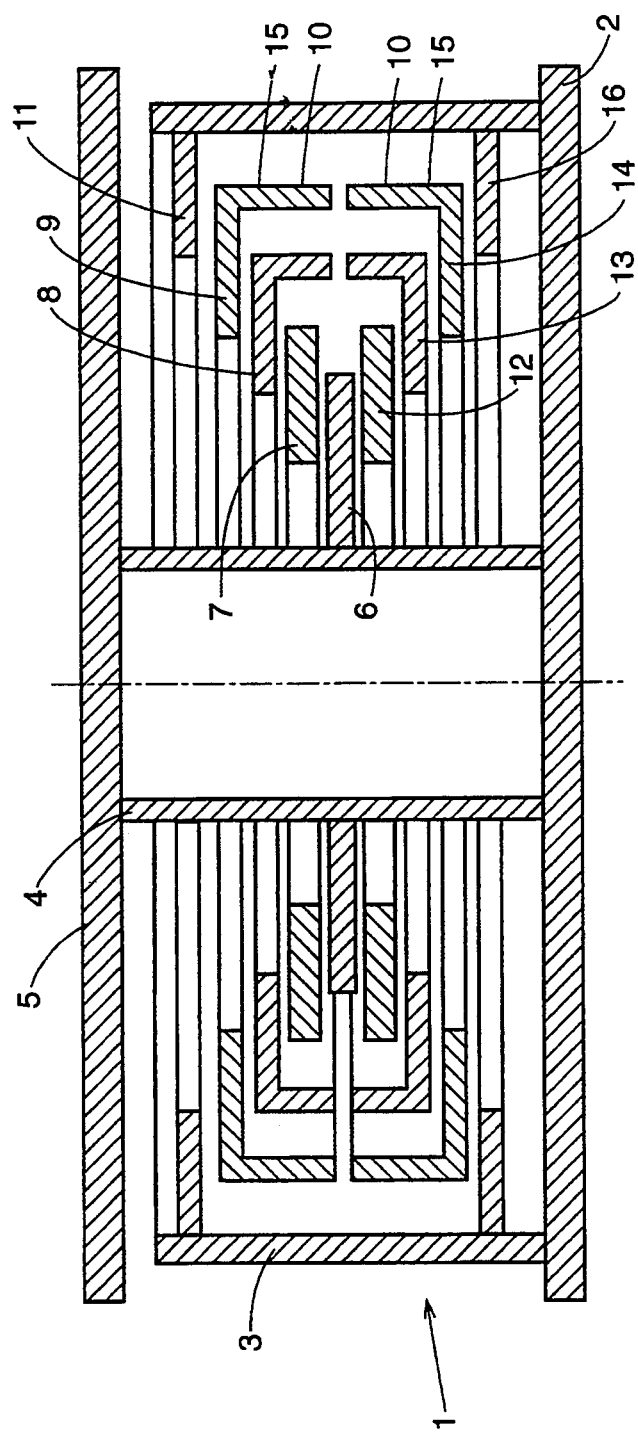

United States Patent [19]

Valdivia et al.

[11] Patent Number: 5,373,920
[45] Date of Patent: Dec. 20, 1994

[54] HORIZONTALLY AND VERTICALLY ACTING VISCOUS MEDIUM VIBRATION DAMPER

[75] Inventors: Anton Valdivia, Wilhelmshaven; Frank-Michael Weber, Berlin, both of Germany

[73] Assignee: Cerb Schwingungsisolierungen GmbH & Co., Germany

[21] Appl. No.: 22,977

[22] Filed: Feb. 25, 1993

[30] Foreign Application Priority Data

Feb. 27, 1992 [DE] Germany ............... 4206097

[51] Int. Cl.⁵ ............... F16F 9/30; E04B 1/36
[52] U.S. Cl. ............... 188/266; 267/140.11; 188/322.5; 52/167 RM
[58] Field of Search ............... 188/266, 279, 268, 297, 188/322.5, 106 F; 267/140.11, 140.13, 141.2, 141.4, 217; 248/562, 638; 52/167 R, 167 RM, 167 EA

[56] References Cited

U.S. PATENT DOCUMENTS

| 2,661,915 | 12/1953 | O'Connor | 188/266 X |
| 4,554,767 | 5/1984 | Ikonomon | 52/167 |

FOREIGN PATENT DOCUMENTS

| 701817 | 10/1937 | Germany . | |
| 3017321 | 11/1981 | Germany . | |
| 3314203 | 10/1984 | Germany . | |
| 3424338 | 1/1986 | Germany . | |
| 3431657 | 3/1986 | Germany . | |
| 4023930 | 2/1992 | Germany | 188/266 |
| 53-19655 | 2/1978 | Japan | 267/140.11 |
| 53-19657 | 2/1978 | Japan | 267/140.11 |
| 0205035 | 11/1984 | Japan | 188/266 |
| 2245531 | 10/1990 | Japan . | |
| 3219130 | 9/1991 | Japan . | |
| 775234 | 10/1980 | U.S.S.R. . | |
| 1043385 | 9/1983 | U.S.S.R. | 188/266 |

*Primary Examiner*—Robert J. Oberleitner
*Assistant Examiner*—Peter M. Poon
*Attorney, Agent, or Firm*—Morgan & Finnegan

[57] ABSTRACT

In a horizontally and vertically acting vibration damper, there is arranged within the damper housing filled with damping medium a series of annular discs, at least one of which is assigned to the damper strut and which are horizontally and vertically movable relative to one another as a whole, the two movements being designated as telescopic. Some of the discs have at their outer edge a driver, so that the horizontal or radial movement of the annular discs can be transmitted to adjacent annular discs after a predetermined travel has been exceeded. By an appropriate calculation of the diameter of the discs, these can be arranged nested one in the other, so that, even with large movements, small constructional sizes are guaranteed.

15 Claims, 4 Drawing Sheets

HORIZONTALLY AND VERTICALLY ACTING VISCOUS MEDIUM VIBRATION DAMPER

The invention relates to a horizontally and vertically acting vibration damper. Moreover particularly, it relates to a vibrating damper using a viscous medium with a damper housing having a cylindrical wall fastened to a baseplate, with a damper strut projecting into the damper housing and to which at least one annular disc is assigned traversely to the longitudinal axis of the damper strut and further disc elements arranged to move freely above the at least one annular disc in the axial direction of the damper strut.

Known viscous dampers consist of a usually cylindrical housing, which is filled with a viscous or elasticoviscous medium, and of a likewise usually cylindrical damper strut which penetrates into the damping medium. One part, usually the damper strut, is connected to the object to be damped mechanically, the other part being connected to a point of fixed location.

Mechanical vibrations of the object bring about a relative movement between the damper housing and damper strut. During this, the mechanical energy of the entire system is converted into heat as a result of shearing and displacement processes in the damping medium. The damping force increases approximately linearly with the viscosity of the damping medium and with the size of the shearing and displacement surfaces moved relative to one another. Furthermore, it increases with decreasing distances between these surfaces.

In vibration dampers of this type, damping forces are generated during any relative movement between the damper housing and damper strut; however, the magnitude of this force is generally dependent on the direction of movement. The ratio of the forces during a pure vertical movement (movement in the direction of the cylinder axis of the housing or strut) and during a pure horizontal movement can be varied within particular limits by means of suitable dimensions of the housing and strut.

Vibration dampers of this type are employed in machine building for the damping of vibratory systems. These can, for example, be machines or machine parts, sensitive measuring instruments set up with vibration insulation, pipelines or complete buildings.

In known dampers of the generic type described in the introduction, for example two annular discs are fastened to the damper strut at an axial distance from one another and, for example, two further annular discs are fastened to the cylindrical continuous wall of the housing at an axial distance from one another, one above the upper damper-strut annular disc and the other between the two damper-strut annular disc and the other between the two damper-strut annular discs. In this known construction, damping forces are generated when the individual annular discs move past one another in parallel during horizontal movements. The horizontal travel is limited by the play of the damper-strut annular discs relative to the damper housing or the play between the damper strut and the annular discs fastened to the housing.

A serious disadvantage of the known vibration dampers is that long travels, such as are required especially in the horizontal direction during use in earthquake protection systems, are virtually impossible. For this purpose, where the known construction is concerned, the distances have to be selected large enough to ensure that the predetermined movements become possible. However, the damping force decreases with increasing distances, and therefore effective vibration dampers then have very large dimensions.

The object on which the invention is based is to provide a damper of the generic type indicated in the introduction, which, while having comparatively small dimensions, allows comparatively large relative movements, especially in the horizontal direction.

This object is achieved, according to the invention, by means of the features of having further annular discs which are arranged to freely move above the at least one annular disc in the axial direction of the damper strut, the first of the further annular discs having an outside diameter larger than and an inside diameter smaller than the outside diameter of the annular disc of the damper strut, and the same diameter ratios applying to each subsequent further annular disc in respect of the preceding further annular disc.

This design, which involves specific diameter ratios and which can have any number of further annular discs, results in a damper which not only allows comparatively large travels in the horizontal direction, but can also be produced in comparatively small spatial dimensions, especially with a comparatively very low constructional height. Moreover, this design permits developments which are best suited to specific instances of use.

To limit the horizontal and/or vertical movement of the annular discs, the arrangement of drivers on the outer edge of the annular discs, especially in the form of annular flanges, is recommended.

For a further reduction of the constructional height, the annular discs can have annular flanges of different diameters and be placed one in the other in a dish-like manner.

According to a particularly advantageous embodiment, a single annular disc is arranged fastenedly on the damper strut, and a group of any number of further annular disc is respectively arranged above and below said single annular disc; at the same time, annular flanges are provided on these, starting from the second further annular disc, as seen from the annular disc of the damper strut, in such a way that the annular flanges of the two annular-disc groups are oriented axially opposite one another. The annular flanges of the two annular-disc groups should be oriented toward one another, as seen from the annular discs.

Furthermore, in this embodiment, there can be provided above the upper annular-disc group and below the lower annular-disc group an annular flange which is connected firmly to the continuous wall and which limits the vertical movements of the annular-disc group and of the damper strut to a predetermined maximum value.

If the last-mentioned annular flanges are not provided, the bottommost annular disc can be arranged lying on the baseplate of the damper housing, this design preferably being used when an especially low constructional height is required.

In a further advantageous design, two annular discs can be arranged fastenedly on the damper strut at an axial distance from one another and the two groups of further annular discs be arranged between these. In this design with two annular-disc groups between two annular discs assigned to the damper strut, the largest annular disc of the two disc groups can belong to both groups, that is to say there is now a single correspondingly large annular disc, to which a double-sided annular flange is then expediently assigned.

Another embodiment of especially low height can be obtained if at least two further annular discs having the special diameter ratios follow the annular disc assigned to the damper strut. In this embodiment, the axial interrelationship of the annular discs can be very close and the horizontal movability can at the same time be very large. The vertical movability of all the discs is limited strictly only by the constructional height of the housing.

In particular, the above-described embodiment can, by doing without the annular flanges, permit a development with additional annular discs, in which a group of further annular discs is arranged on one side of the annular disc of the damper strut and a group of additional annular discs is arranged on the other side of the annular disc of the damper strut, this taking place with a correspondingly high damping effect in the vertical and the horizontal direction. Moreover, in the horizontal direction, the annular discs, because of their close interrelationship, behave virtually in the same way as a telescope.

Of course, a plurality of "large groups" of annular discs can be provided, each consisting of a group of further annular discs and of a group of additional annular discs and both arranged in the way described above. A further improvement of the damping effect can be achieved thereby.

Figure 2:
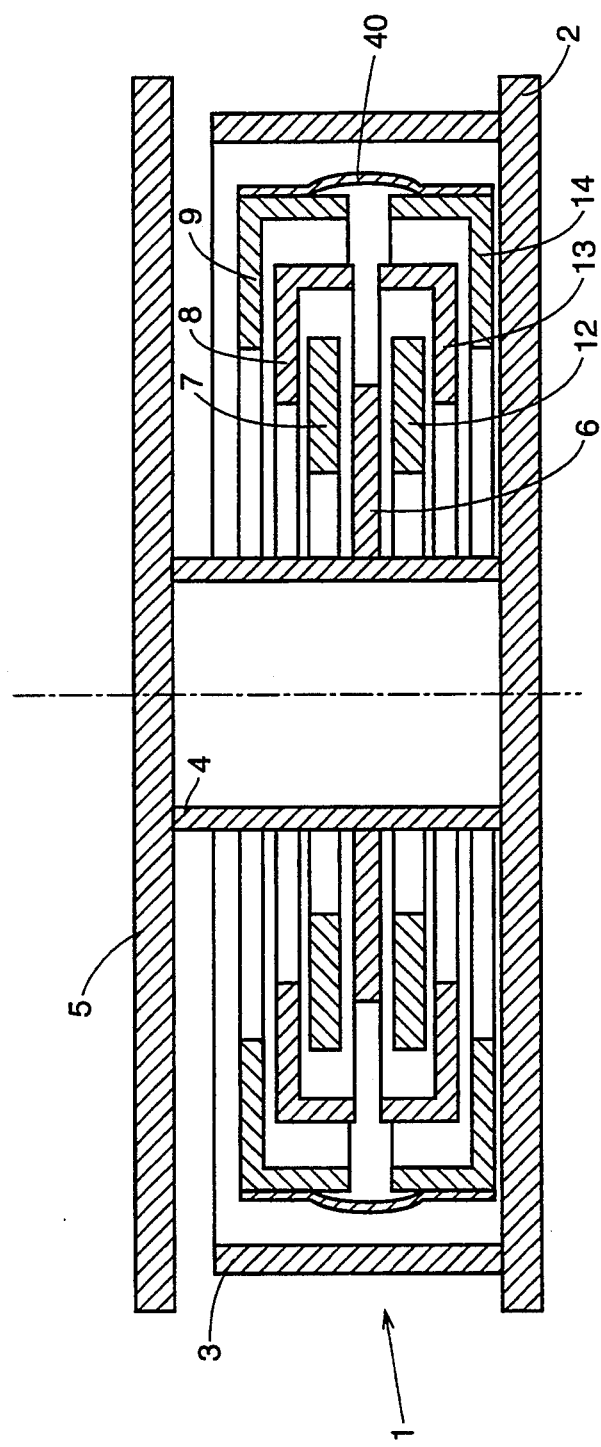
Figure 3:
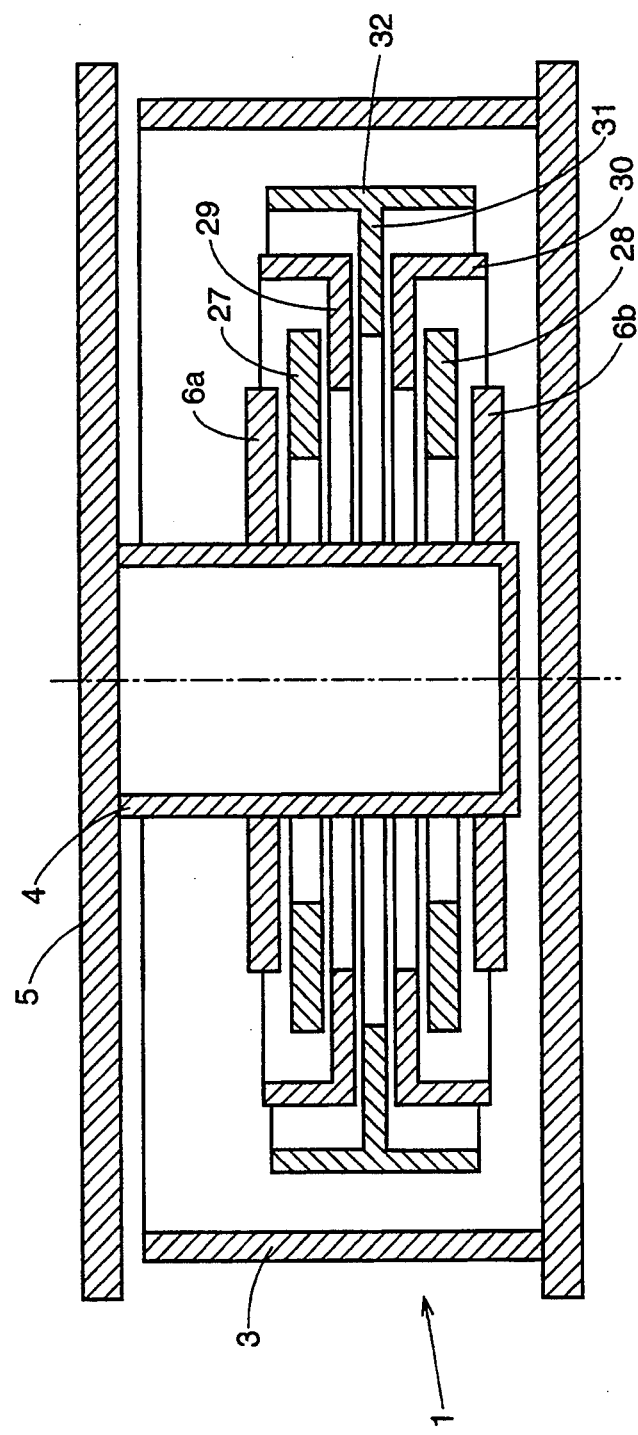
Figure 4:
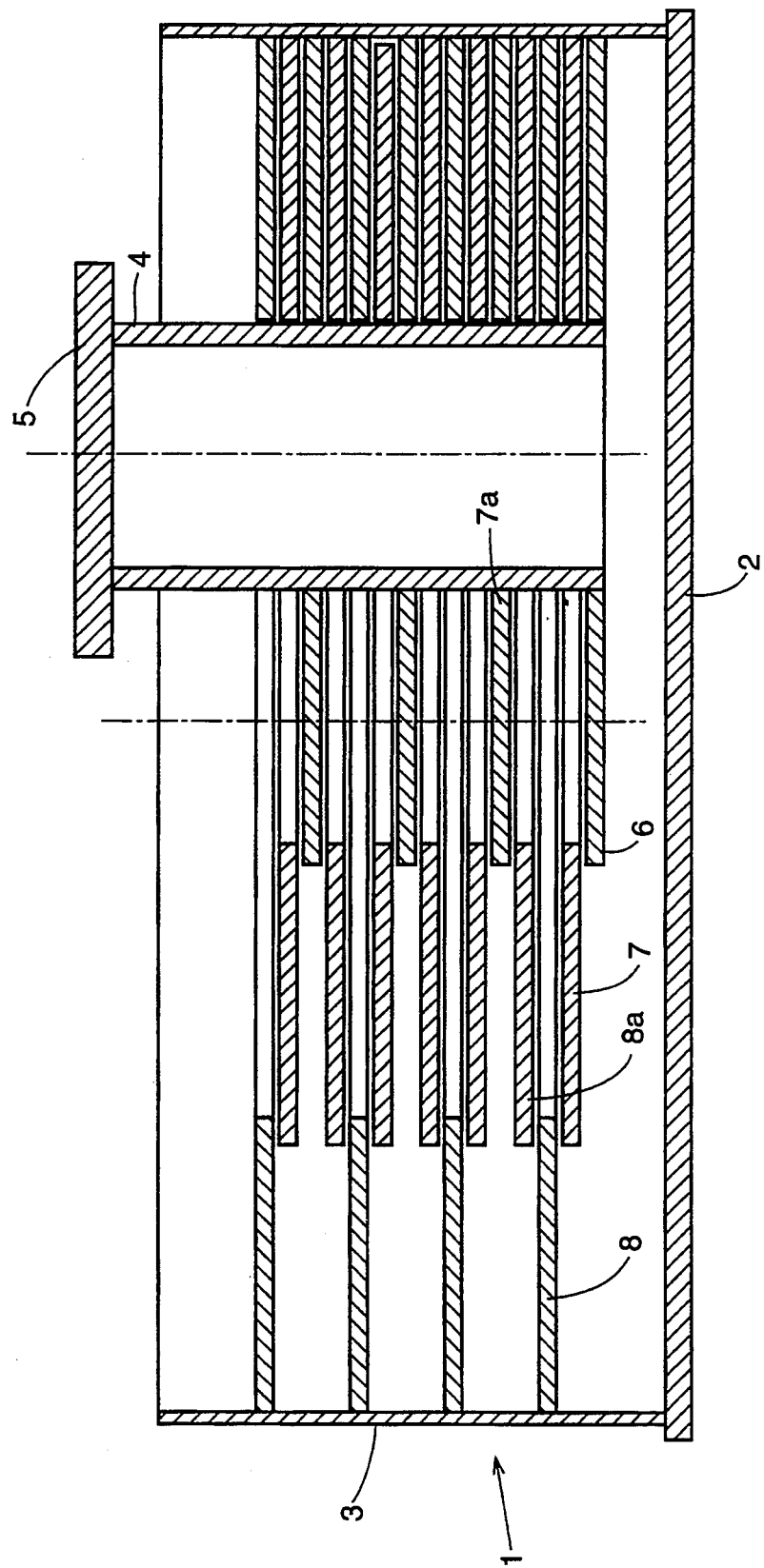

The invention is described below in more detail and purely by way of example with reference to the drawings; in these:

FIG. 1 shows a vertical section through a first embodiment of a damper according to the invention, FIG. 2 shows a vertical section through a second embodiment, FIG. 3 shows a vertical section through a third embodiment, in which an especially low constructional height can be obtained, and FIG. 4 shows a vertical section through a fourth embodiment.

Accordingly to FIG. 1, the damper consists of an outer damper housing i having a lower baseplate 2 and a preferably cylindrical continuous wall 3 and of a damper strut 4 which projects from above into the damper housing 1 and which is fastened to a coverplate 5. Connected to the damper strut 4 is an essentially central annular disc 6 which is surrounded by an upper and a lower group, each with a plurality of annular discs. The upper disc group comprises a plane annular disc 7 and, furthermore, two annular discs 8 and 9 which are provided at their outer circumferential edge with a driver in the form of an annular flange 10 and 15. Finally, there also follows an annular disc 11 which is fastened to the upper edge of the continuous wall 3. The lower disc group comprises a plane annular disc 12, two annular discs 13 and 14 which are equipped with an annular flange 10 and 15, and finally an annular disc 16 which is arranged on the bottom region of the continuous wall 3.

The disadvantage of low horizontal displaceability is avoided by means of the damper according to FIG. 1.

In the embodiment shown, the baseplate 2 serves as a fastening means or fixed point. The damper housing 1 is filled with viscous damping medium. The damper strut 4 is connected via the coverplate 5 to a vibrating object (not shown). The annular discs 7, 8 and 9 of the upper disc group and the annular discs 12, 13 and 14 of the lower disc group are freely displaceable. The annular discs 8 and 9 as well as 13 and 14 each have such a diameter that two annular discs 8 and 9 or 13 and 14 are respectively arranged to engage one in the other in a dish-like manner. The annular flanges 10 and 15 of the annular discs 8, 9 and 13, 14 have the function of a driver. When the damper strut 4 is moved in the horizontal direction, forces have to be applied, and these allow the shearing of the viscous damping medium between the annular disc 6 and the adjacent annular disc 7 or 12. The annular disc 7 is supported on the annular disc 8, the latter on the annular disc 9 and this then on the annular disc 11 fastened to the continuous wall 3. These conditions applying to the upper disc group also apply similarly to the lower disc group.

Depending on the dimensions of the individual components, the distance between the damper strut 4 and the continuous wall 3 is divided up into smaller displacements of the individual annular discs. Where a high viscosity damping medium is concerned, all the annular discs move simultaneously in such a way that the total travel corresponds to the relative travel between the damper strut 4 and continuous wall 3. As regards very low-viscosity damping media, a telescopic movement is obtained. In the first place, the damper strut 4 together with the annular disc 6 moves; the damping medium is sheared between the annular discs 6 and 7. When a travel determined by construction is exceeded, in the first place the annular disc 7 is taken up, the damping force being generated as a result of the shearing of the damping medium between the annular discs 7 and 8. Subsequently, the annular disc 8 is also moved and itself takes up the annular disc 9 where even larger travels occur. Very large horizontal travels can become possible in this way, while the damping forces can assume very high values because the distances between the annular discs can be as small as desired.

The forces can attain similar orders of magnitude when the damper strut 4 is moved in the vertical direction. These forces are generated mainly as a result of the displacement of the damping medium between the annular discs 6, 7, 8, 9 and 11. In contrast to the horizontal movement, the vertical movement is restricted by the special design. During the downward movement of the damper strut 4, the lowest point is reached when the annular discs 6 and 12, 12 and 13, 13 and 14 as well as 14 and 16 rest on one another in pairs. The same applies accordingly to an upward movement of the damper strut 4.

The axial extension of each annular flange 10 and 15 of the movable annular discs 8, 9 and 13, 14 must be calculated so that it is longer than the distance between the mutually confronting surfaces of the annular discs 11 and 16 fixed to the continuous wall 3, less the axial thicknesses of all the annular discs, that is to say the annular discs 6, 7, 8, 9 and 12, 13, 14, located between the annular disc 11 and 16. Such a calculation of the axial extension of the annular flanges 10 and 15 guarantees a permanent coupling of all the annular discs and prevents the disc group consisting, for example, of the annular discs 6, 7, 8 and 9 and the group consisting of the annular discs 6, 12, 13, 14 from falling apart. At the same time, this prevents an inclination of the individual annular discs from forming, which could lead to jamming, as a result of which the annular discs would be prevented from moving apart when they moved opposite to one another.

When larger vertical travels are needed, the embodiment according to FIG. 1 can be modified so that the annular disc 6 is not arranged firmly on the damper strut 4, but maintains radial distance from the damper strut 4 or is arranged with radial play relative to the damper strut 4. The difference from the embodiment according to FIG. 1 is then that be annular disc 6 is connected to the damper strut 4 so as to be vertically displaceable. Substantially larger vertical movements thereby become possible; however, the damping force is considerably lower than in the embodiment illustrated in FIG. 1. It is then obtained virtually only as a result of the shearing of the damping medium between the damper strut 4 and the inner surfaces of the annular discs 6, 7, 8, 9 and 11 or 6, 12, 13, 14 and 16. If the damper strut 4 is closed off at its lower end, an additional displacement component in the vertical direction or a shearing component during a horizontal movement can be generated. This alternative is appropriate, above all, for use in conjunction with earthquake protection systems, where the vertical movements usually do not necessitate any appreciable damping.

FIG. 2 shows an embodiment which differs from that of FIG. 1 primarily in that the annular discs 11 and 16 are omitted. This embodiment is therefore very simple to produce.

In a further contrast to the embodiment according to FIG. 1, in order to limit the vertical movement, a concertina-shaped sleeve 40 is provided on the outer circumference of the two disc groups in such a way that the two can move away from one another in the axial direction by the amount of a predetermined travel only. The sleeve 40 is thus fastened to the uppermost and to the bottommost annular disc 9 and 14, respectively, and prevents these two discs from moving too far apart.

In the embodiment according to FIG. 2, the vertical damping effect comes about mainly as a result of the displacement of the damping medium. The vertical damping travel is substantially larger than in the damper according to FIG. 1.

In the embodiment according to FIG. 3, two annular discs 6a, 6b are arranged firmly on the damper strut 4 at an axial distance from one another. Two groups of a plurality of annular disc are provided in the interspace between these. Each group comprises a plane annular disc 27 and 28, respectively, furthermore an annular disc 29 and 30, respectively, each with an outer annular flange, and finally a central annular disc 31 which belongs to both groups and which is equipped with a double annular flange 32 projecting from the outer edge of the annular disc 31 in the axial direction on mutually opposite sides.

The embodiment according to FIG. 3 is suitable especially for high vertically acting damping forces, specifically in the event of large movements. Since no annular discs 11 and 16 according to FIG. 1 are present in this embodiment, larger vertical movements are possible. If there are suitable dimensions, it is possible to have vertical movements of virtually any size which are associated with a damping force generated mainly as a result of the displacement of the damping medium on the upper and lower surfaces of the disc groups. The operating mode already described above occurs in the horizontal direction. With the damping effect in the vertical direction being maintained, the damping force for horizontal movements can be increased as desired if a plurality of disc sets, consisting of annular discs 27, 29, 31, 30, 28 is provided. It may then even be possible to have only one further annular disc 6a and 6b, if appropriate, for every further set.

In the embodiment of FIG. 4, which, in a top view, has an essentially circular shape, an annular disc 6 is arranged firmly on the damper strut 4 and is therefore movable both vertically and horizontally together with the damper strut 4. This annular disc 6 is followed in the axial direction by a first further annular disc 7 and a further annular disc 8, each further annular disc having in respect of the preceding annular disc an outside diameter larger than the latter and an inside diameter smaller than the outside diameter of the latter. The last of the further annular discs illustrated, namely, in the instance shown, the further annular disc 8, is followed by additional annular disc 8a and 7a, the same diameter ratios as just indicated applying to these and the annular discs respectively preceding them. However, the smallest of the additional annular discs, namely the annular disc 7a, is not arranged firmly on the damper strut 4, but is assigned to the latter with slight radial play. Moreover, such a radial play is provided relative to the continuous wall 3 on the outside of the annular disc 8. The two radial plays mentioned serve for the movability of the damper strut 4, together with the above mentioned annular discs, in the vertical direction. In the horizontal direction, a displacement of the damper strut 4 out of the right-hand end position shown in FIG. 4 to the left brings about a displacement of the annular discs 6 and 7a relative to the annular discs 7 and 8a or to the annular disc 8. This displacement is virtually a telescopic displacement.

To increase the damping effect both in the horizontal and in the vertical direction, the damper can be equipped with a plurality of "large groups" of annular discs in the way described above, as can also be seen from FIG. 4. For the instance shown there, the respectively smallest additional annular disc 7a of a first "large group" forms at the same time the smallest further annular disc of the next "large group" it therefore constitutes an equivalent to the annular disc 6 of the first "large group", but without at the same time being arranged firmly on the damper strut 4.

This embodiment is distinguished by an especially low constructional height in respect of a disproportionately high damping effect in the vertical direction, and at the same time it allows relatively very large horizontal movements.

Moreover, a series of changes and modifications to the exemplary embodiment shown is possible; thus, for example in the embodiment according to FIG. 2, the annular disc 6 can be arranged on the damper strut 4 with radial play, in order thereby to produce a specific damping characteristic. There is also the possibility of arranging the respective disc groups shown multiply above one another and of equipping them with any number of annular discs, in order thereby to make it possible to produce higher damping forces.

All the embodiments have an especially compact design, in particular a constructional height which is kept low.

We claim:

1. A horizontally and vertically acting vibration damper, comprising
   a damper housing having a preferably cylindrical continuous wall fastened to a baseplate,
   a damper strut which projects into the damper housing along a longitudinal axis, at least one annular disc extending transversely in an axial direction from the damper strut,
a plurality of overlapping annular disc elements positioned further from the strut in the axial direction,
a viscous damping medium,
wherein said annular disc elements are successively arranged above the transversely extending annular disc in the axial direction to the damper strut each annular disc element having a greater inner and outer diameter than successively positioned disc elements in the longitudinal direction toward the damper strut annular disc so that said disc elements may be telescopingly moved relative to each other.

2. The damper as claimed in claim 1, including a driver formed on each of at least some of the further annular disc elements at the outer edge by means of which the horizontal or radial movement of the annular discs can be transmitted to the adjacent annular discs after a predetermined travel has been exceeded.

3. The damper as claimed in claim 2, wherein the driver is designed as an axial annular flange.

4. The damper as claimed in claim 3, wherein the annular disc elements with annular flanges have different diameters and can be placed one in the other in a dishlike manner.

5. The damper as claimed in claim 1, wherein said damper annular disc is fastened on the damper strut, and a group of further annular disc elements including at least first and second sets of disc elements are respectively arranged above and below said damper fastened annular disc, said group of further annular disc elements including an annular flange starting from the second set of further annular disc elements, and wherein the annular flanges of a respective disc element set are oriented axially opposite one another.

6. The damper as claimed in claim 5, wherein the plurality of further disc elements include an uppermost annular disc of larger diameter in an upper annular-disc group and a bottommost annular disc of larger diameter in a lower annular-disc group, wherein said uppermost annular disc of the upper annular-disc group is connected to the bottommost annular disc element of the lower annular-disc group via a concertina-shaped sleeve.

7. The damper as claimed in claim 6, wherein there is provided above the upper and below the lower disc group an annular flange which is connected firmly to the continuous wall and which limits the vertical movements of the annular-disc groups and of the damper strut.

8. The damper as claimed in claim 5, wherein two annular disc elements are fastened on the damper strut at a spaced distance from one another, and two sets of further annular disc elements are positioned between the two annular discs fastened to the damper strut.

9. The damper as claimed in claim 8, including an annular disc element spaced axially further from the strut than the two groups of disc elements, and including an annular flange directed upwards and downwards at the outer edge of the further spaced disc element.

10. The damper as claimed in claim 1, wherein at least two further annular disc elements have diameter ratios substantially similar to the diameter ratio of the annular disc extending transversely to the damper strut.

11. The damper as claimed in claim 10, wherein an equal number of additional annular disc elements follow the at least two further annular disc elements with similar diameter ratios.

12. The damper as claimed in claim 11, including at least one further annular-disc element set extending transversely beyond the prior successive disc elements, wherein the two annular disc elements having the smallest inside diameter extend from the damper strut.

13. The damper as claimed in claim 12, wherein the smallest diameter annular disc element extends between the annular-disc element set.

14. The damper is claimed in claim 1, wherein the damper strut is designed as a cylindrical tube.

15. The damper as claimed in claim 14, wherein the damper strut is designed to be closed at its free end.

* * * * *

UNITED STATES PATENT AND TRADEMARK OFFICE
CERTIFICATE OF CORRECTION

PATENT NO. : 5,373,920

DATED : December 20, 1994

INVENTOR(S) : A. Valdivia and F. Weber

It is certified that error appears in the above-identified patent and that said Letters Patent is hereby corrected as shown below:

Title page, item [73]

The Assignee should read: "Gerb Schwingungsisolierungen GmbH & Co." not "Cerb Schwingungsisolierungen GmbH & Co."

Signed and Sealed this

Thirtieth Day of May, 1995

Attest:

BRUCE LEHMAN

Attesting Officer

Commissioner of Patents and Trademarks